United States Patent
Pichlmaier

(10) Patent No.: US 9,078,391 B2
(45) Date of Patent: *Jul. 14, 2015

(54) TRACTOR CONTROL SYSTEM

(75) Inventor: Benno Pichlmaier, Munich (DE)

(73) Assignee: AGCO INTERNATIONAL GmbH, Neuhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/234,005

(22) PCT Filed: Jun. 26, 2012

(86) PCT No.: PCT/EP2012/062372
§ 371 (c)(1),
(2), (4) Date: Aug. 5, 2014

(87) PCT Pub. No.: WO2013/013917
PCT Pub. Date: Jan. 31, 2013

(65) Prior Publication Data
US 2014/0343802 A1 Nov. 20, 2014

(30) Foreign Application Priority Data

Jul. 22, 2011 (GB) .................................. 1112568.9

(51) Int. Cl.
*G06F 19/00* (2011.01)
*A01B 63/10* (2006.01)
(Continued)

(52) U.S. Cl.
CPC ............... *A01B 63/10* (2013.01); *A01B 63/112* (2013.01); *A01B 63/14* (2013.01); *G01G 1/00* (2013.01); *G01G 19/08* (2013.01)

(58) Field of Classification Search
CPC ...... A01B 63/14; A01B 63/10; A01B 63/112; A01B 63/02; A01B 63/06; A01B 63/11; G01G 1/00; G01G 19/08; G01G 19/086

USPC .......................................................... 701/50
See application file for complete search history.

(56) References Cited

U.S. PATENT DOCUMENTS 4,512,433 A * 4/1985 van der Lely ................. 180/235
4,846,283 A 7/1989 Batcheller
(Continued)

FOREIGN PATENT DOCUMENTS

DE 2910180 A1 10/1980
EP 1825734 A1 8/2007
(Continued)

OTHER PUBLICATIONS

International Search Report for International Application No. PCT/EP2012/062372 Dated Jun. 26, 2012.
(Continued)

*Primary Examiner* — Fadey Jabr
*Assistant Examiner* — Angelina Shudy

(57) ABSTRACT

A control system for a tractor (10) fitted with two or more axles (21, 22) which carry wheels (13, 14) having pneumatic tires and which is set up to pull an implement or trailer. The system having a display means (28) for displaying to a tractor operator tractor performance parameters and has sensors to determine the current pull force (F) applied to the implement or trailer, the current wheel load and the current tractor ground speed (V). The system also has a control unit which determines and advises the tractor operator via the display means (28) as to the optimum weight of the tractor (10) using a predetermined relationship between pull force (F) and tractor weight and also the required load on each axle (21, 22) to achieve a predetermined optimum axle load ratio. The system also advises via the display means (28) the appropriate tire pressure for the current wheel load and tractor ground speed (V) using a look-up table.

31 Claims, 11 Drawing Sheets

(51) Int. Cl.
*A01B 63/112* (2006.01)
*A01B 63/14* (2006.01)
*G01G 1/00* (2006.01)
*G01G 19/08* (2006.01)

(56) References Cited

U.S. PATENT DOCUMENTS

| | | | |
|---|---|---|---|
| 5,629,874 A | 5/1997 | Mittal | |
| 6,144,910 A * | 11/2000 | Scarlett et al. | 701/50 |
| 6,666,279 B2 * | 12/2003 | Scarlett et al. | 172/1 |
| 7,174,974 B2 * | 2/2007 | Bloom et al. | 175/51 |
| 7,216,024 B1 * | 5/2007 | Abels et al. | 701/50 |
| 7,337,054 B2 * | 2/2008 | Pandey et al. | 701/82 |
| 8,965,640 B2 * | 2/2015 | Faivre et al. | 701/50 |
| 2004/0079557 A1 * | 4/2004 | Saxon et al. | 177/136 |
| 2009/0139790 A1 * | 6/2009 | O'Neal | 180/290 |
| 2010/0198466 A1 * | 8/2010 | Eklund et al. | 701/50 |
| 2011/0049837 A1 | 3/2011 | Hapyuk et al. | |
| 2014/0222302 A1 * | 8/2014 | Pichlmaier | 701/50 |

FOREIGN PATENT DOCUMENTS

| | | |
|---|---|---|
| EP | 1889531 A1 | 2/2008 |
| WO | WO-82/01354 A1 | 4/1982 |
| WO | WO-00/34060 A1 | 6/2000 |
| WO | WO-2011/033015 A1 | 3/2011 |

OTHER PUBLICATIONS

UK Search Report for GB Application No. 1112568.9 Dated Jul. 22, 2011.

* cited by examiner

FRONT: Tire Size and Type 600/70 R34 160D

| Speed | 0.6bar | 0.8bar | 1.0bar | 1.2bar | 1.4bar | 1.6bar | 2.0bar | 2.4bar |
|---|---|---|---|---|---|---|---|---|
|  | 9psi | 12psi | 15psi | 17psi | 20psi | 23psi | 29psi | 35psi |
| 70 S |  |  | 2540 | 2865 | 3195 | 3550 | 3850 | 4125 |
| 65 S |  |  | 2790 | 3150 | 3510 | 3875 | 4230 | 4500 |
| 50 S | 2220 | 2550 | 2930 | 3310 | 3685 | 4000 | 4440 | 4750 |
| 40 S | 2315 | 2660 | 3055 | 3450 | 3845 | 4250 | 4630 | 5000 |
| 30 S | 2430 | 2795 | 3210 | 3625 | 4035 | 4500 | 4865 | 5150 |
| 10 LT S | 2765 | 3175 | 3645 | 4185 | 4725 | 5265 | 5800 | 6300 |
| 10 HT S | 2430 | 2795 | 3210 | 3625 | 4035 | 4500 | 4865 | 5150 |

REAR: Trelleborg: Tire Size and Type 710/75 R42 175D

| Speed | 0.6bar | 0.8bar | 1.0bar | 1.2bar | 1.4bar | 1.6bar | 2.0bar | 2.4bar |
|---|---|---|---|---|---|---|---|---|
|  | 9psi | 12psi | 15psi | 17psi | 20psi | 23psi | 29psi | 35psi |
| 70 S |  |  | 3910 | 4410 | 4915 | 5400 | 5900 | 6300 |
| 65 S |  |  | 4280 | 4830 | 5385 | 5935 | 6485 | 6900 |
| 50 S | 3405 | 3910 | 4490 | 5070 | 5650 | 6230 | 6810 | 7300 |
| 40 S | 3550 | 4080 | 4685 | 5290 | 5895 | 6500 | 7100 | 7750 |
| 30 S | 3730 | 4285 | 4920 | 5555 | 6190 | 6825 | 7460 | 8000 |
| 10 LT S | 4235 | 4865 | 5590 | 6415 | 7245 | 8075 | 8900 | 9750 |
| 10 HT S | 3730 | 4285 | 4920 | 5555 | 6190 | 6825 | 7460 | 8000 |

TRACTOR CONTROL SYSTEM

This invention relates to tractor control systems which record and display tractor performance parameters and may also control certain functions of the tractor in order to improve its performance.

Several factors which affect tractor performance are the use of excessive weight and the use of in appropriate tyre pressures.

The term "performance" as used throughout this application should be interpreted broadly so that, for example, it is seen as equivalent to the term "power" in the sense that performance may be a parameter with the unit of, for example, Watts or Kilowatts but may also mean a performance related to a working process with units of, for example, hectare/per hour.

It is an object of the present invention to provide a control system which helps to at least mitigate problems associated with the above factors.

Thus according to the present invention there is provided a control system for a tractor fitted with two or more axles which carry wheels having pneumatic tyres and which is set up to pull an implement or trailer, the system having a display means for displaying to a tractor operator tractor performance parameters and having sensors to determine the current pull force applied to the implement or trailer, the current wheel load and the current tractor ground speed, the system also having a processing unit which determines and advises the tractor operator via the display means as to the optimum weight of the tractor using a predetermined relationship between pull force and tractor weight and also the required load on each axle to achieve a predetermined optimum axle load ratio.

The processing unit also advises the operator via the display means as to the appropriate tyre pressure for the current wheel load and tractor ground speed using a look-up table.

Such a system will advise the operator as to any weight he should add or remove from the tractor and if he should reposition the weight etc to adjust the relative weight supported by the axles. Also the system will also advise the operator as to the correct tyre pressure which should be used for the current task.

Preferably the look-up table provides the lowest equal tyre pressure appropriate for the current wheel load, ground speed and tyre size fitted to the tractor to give minimum ground pressure to carry the load.

The system preferably applies an optimum axle load ratio of 40/60 between front/rear axles of the tractor.

The predetermined ratio of pull load/tractor weight applied by the system is 0.4.

The processing unit may calculates a real time value for the current ratio of pull force/tractor weight.

The real time value of the current ratio of pull force/tractor weight may be calculated by measuring a plurality of individual values of pull force over a sample period and calculating in the processing unit the respective ratios therefrom, eliminating extreme and/or clearly incorrect or unrepresentative individual ratio values, averaging the ratio values in individual ratio zones and plotting these averaged zonal ratio values recorded in the sample period to generate a best fit curve for these plotted values, then selecting as the current real time value either the average ratio value for the ratio zone in which the tractor is operating for the longest time or the ratio on the curve with the highest value of tractive efficiency (pull force applied to implement or trailer/performance output at wheel hub).

The pull load may be measured using sensing pins which attach lower implement attachment links to the tractor or any other suitable load sensing arrangement.

In a control system for a tractor which includes a transmission with a hydraulic circuit in which a hydraulic pump supplies pressure to a hydraulic motor, the pull force may be determined by sensing the pressure in the hydraulic circuit, whereby the pressure in the hydraulic circuit is a measure of the wheel or axle torque, the wheel or axle torque divided by the dynamic wheel radius is a measure for the wheel circumference force, consisting of rolling resistance force and pull thus giving a rough estimation of pull force.

In a control system for a tractor with a rigid unsprung axle the wheel load may be measured by a strain gauge type sensor which measures the deflection of part of the rigid axle which supports a wheel.

In a control system for a tractor having an axle suspended by fluid pressure the wheel load may be determined by measuring the fluid pressure which is suspending the axle and the position of the axle.

In a system for a tractor in which the proportion of the weight of the implement or trailer which is supported by the tractor can be varied, the display means may indicating the weight of the implement or trailer supported by the tractor to assist the operator in varying the axle load distribution towards the required figure determined by the system.

An above system may be provided in which a rear hitch allows the attachment point of the implement or trailer to be moved in a fore, aft and/or downwards and upwards sense relative to the tractor to change the axle load distribution towards the required figure determined by the system.

The vertical load applied by the implement or trailer to the tractor is measured using pressure sensors in hydraulic cylinders driving lower implement attachment links or top link.

In a system for a tractor provided with a weight which is movable in a fore and aft sense relative to the tractor, the display means may indicate the change in axle load resulting from the movement of the weight to assist the operator in varying the axle load distribution towards the required figure determined by the system.

In a system for a tractor having driven front and rear axles and provided with a drive transmission which can vary the proportion of engine output torque which is directed to each axle, the display means may display the output torque delivered to each axle.

In the above system the processing means may proportion the engine torque between the axles so that each wheel operates at substantially the same level of slip relative to the contacting ground independent of external operating conditions.

The display means may display the wheel slip of each axle.

The processing means may calculate and the display means may display various tractor efficiencies such as engine efficiency which is equal to the engine output performance at the crank shaft/output provided by the fuel consumed, driveline efficiency which is equal to performance output at the wheel hub/performance output at the crank shaft, tractive efficiency which is equal to the pull force applied to the implement or trailer/performance output at the wheel hub, crank to hitch efficiency which is equal to the pull force applied to the implement or trailer/performance output at the crank shaft and tank to hitch efficiency which is equal to the pull force applied to the implement or trailer/output provided by the fuel consumed.

The processing unit may receive signals from sensors which determine various operating conditions of the tractor and operator's inputs and process these signals and inputs to provide selected performance parameters for display on the display means, the processing means also providing a simulation mode in which the operator can enter proposed changes in operating conditions of the tractor and the processing means can indicate on the display means the effect of these proposed changes on selected tractor performance parameters.

The display means may advise the operator on changes which can be made to the operating conditions of the tractor to improve operating efficiency.

The display means may differentiate between measured values of displayed parameters, advised values of the displayed parameters, values of the displayed parameters changed by the operator and simulated values of the displayed parameters.

The system may differentiate between the different types of displayed parameters by using different display pages and/or separate pop-up menus and/or different colours for the different types of displayed values.

The processing unit may be set up to issue output signals to automatically change certain operating conditions of the tractor to improve operating efficiency.

The processing unit may recognise when certain facilities or functions are not available on the tractor and advises the operator accordingly via the display means.

The display means may indicate the current axle and/or wheel loading of the tractor.

The real time value of the current ratio of pull force/tractor weight may be displayed on the display means.

The display means may display the current pull force applied to the implement or trailer.

The present invention also provides a control/display system for a tractor fitted with two or more axles which carry wheels and which is set up to pull an implement or trailer, the system having a display means for displaying to a tractor operator tractor performance parameters and having sensors to determine the current pull force applied to the implement or trailer and the current wheel load, the system also having a processing unit which determines the real time current ratio pull force and tractor weight by measuring a plurality of individual values of pull force over a sample period and calculating in the processing unit the respective ratios therefrom, eliminating extreme and/or clearly incorrect or unrepresentative individual ratio values, averaging the ratio values in individual ratio zones and plotting these averaged zonal ratio values recorded in the sample period to generate a best fit curve for these plotted values, then selecting as the current real time value either the average ratio value for the ratio zone in which the tractor is operating for the longest time or the ratio on the curve with the highest value of tractive efficiency (pull force applied to implement or trailer/performance output at wheel hub).

The present invention will now be described with reference to the accompanying drawings in which.

Figure 1:
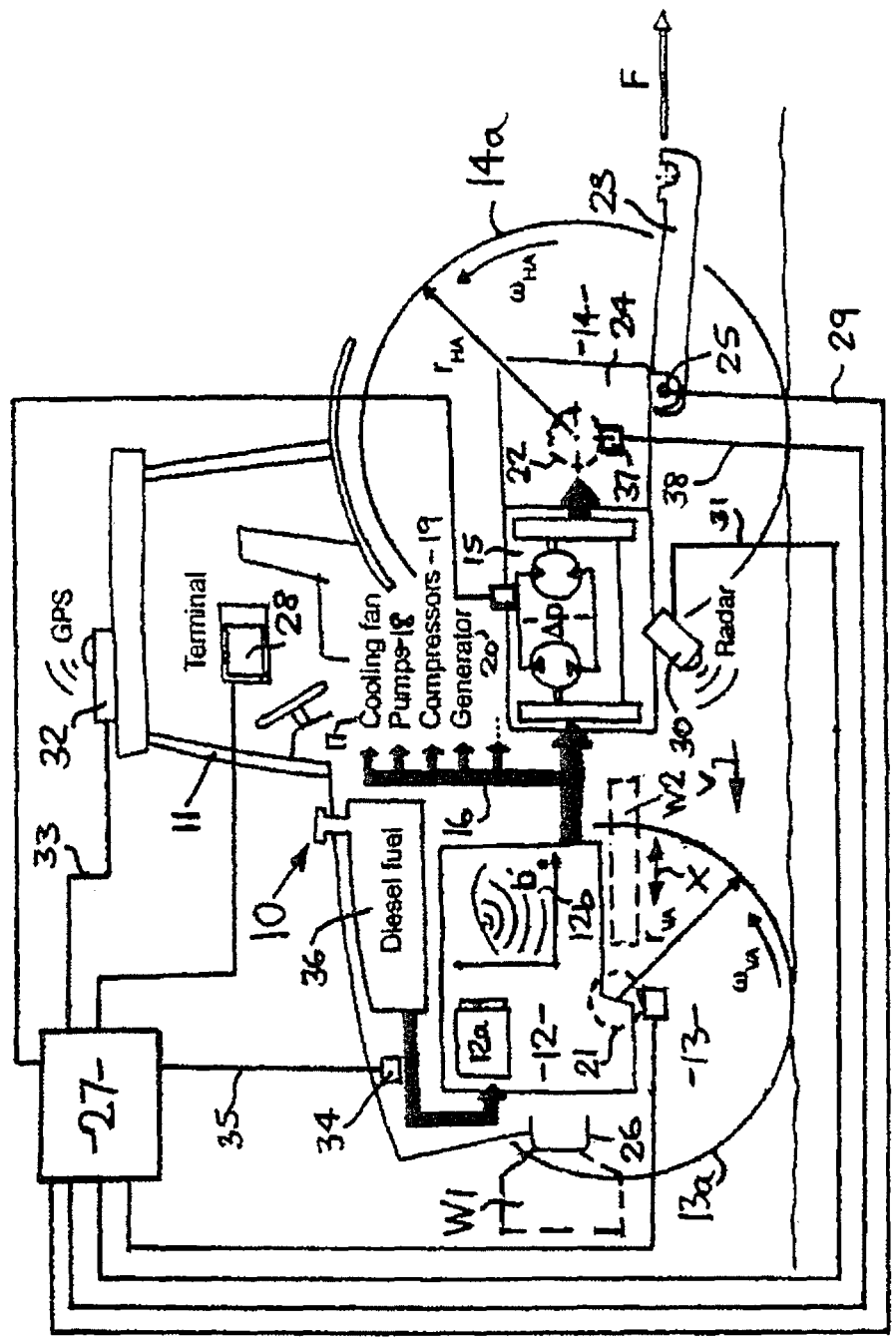
FIG. 1 shows a diagrammatic view of a tractor showing the various sensors used by a control system in accordance with the present invention.

Referring to the drawings, the tractor 10 has a cab 11 and engine 12 which drives front and rear wheels 13 and 14 via a transmission diagrammatically shown at 15. As also indicated diagrammatically at 16 in FIG. 1, the engine powers other components of the tractor such as an engine cooling fan 17, hydraulic pumps 18, air compressors 19 and an electrical generator 20. Front wheels 13 are mounted on a front axle shown diagrammatically at 21 and rear wheels 14 on a rear axle shown diagrammatically at 22. Rear implement attachment lower links 23 are attached to a back axle housing 24 by sensing pins 25.

Figures 4, 5:
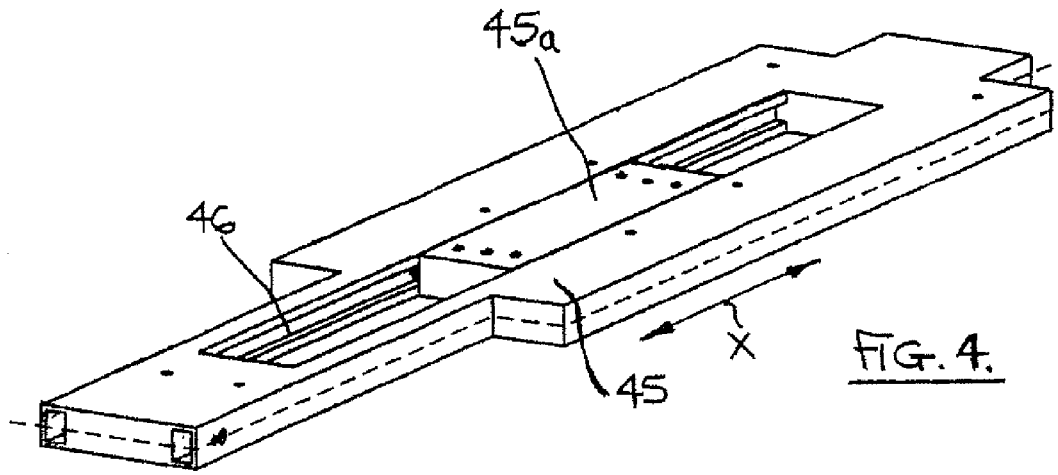
FIG. 4 shows diagrammatically how a weight may be moved in a fore and aft direction relative to a tractor to adjust axle loading.
FIG. 5 shows look-up tables used to establish the front and rear wheel tyre pressures dependent on wheel load and tractor ground speed.

Front weights W1 are mounted on a weight support 26 attached to the front of the tractor chassis and beneath the tractor the movable weight W2 is provided which can be moved in the fore and aft direction as indicated by arrow X in FIG. 1 to adjust the weight distribution on the axles 21 and 22. An example of a suitable form of movable weight W2 is disclosed in the Applicant's co-pending patent application No. 1017368.0 which is also shown in FIG. 4.

Mounted within the cab 11 is a tractor control system in accordance with the present invention which includes a processing unit 27 and a display terminal 28 which also acts as an input device for the control system.

The tractor is provided with various sensors which feed their sensors signals to the processing unit 27. For example, the output of the sensing pins 25 (which is indicative of the pull force being applied to any coupled implement or trailer) is fed via line 29 to processing unit 27. The ground speed V of the tractor is sensed by a radar unit 30 which feeds is speed signal via line 31 to processing unit 27. The position of the tractor is fed from GPS unit 32 via line 33 to control unit 27. The information received from GPS unit 32 may be alternatively used to determine ground speed V of the tractor which may be more precise than using radar unit 30. A fuel consumption sensor 34 is connected via line 35 to processing unit 27 and detects the amount of fuel being supplied from fuel tank 36 to engine 12. Engine 12 is controlled by an electronic unit 12a using performance maps indicated diagrammatically at 12b. Electronic unit 12a may alternatively deliver fuel consumption value based on engine parameters.

Rear axle 22 is rigid and strain gauge sensors 37 are attached to each side of the back axle cast housing 24 to measure deflections of the back axle housing which are indicative of the load being supported by the rear wheels 14. The output of wheel load sensors 37 is fed via lines 38 to processing unit 27.

Figure 2:
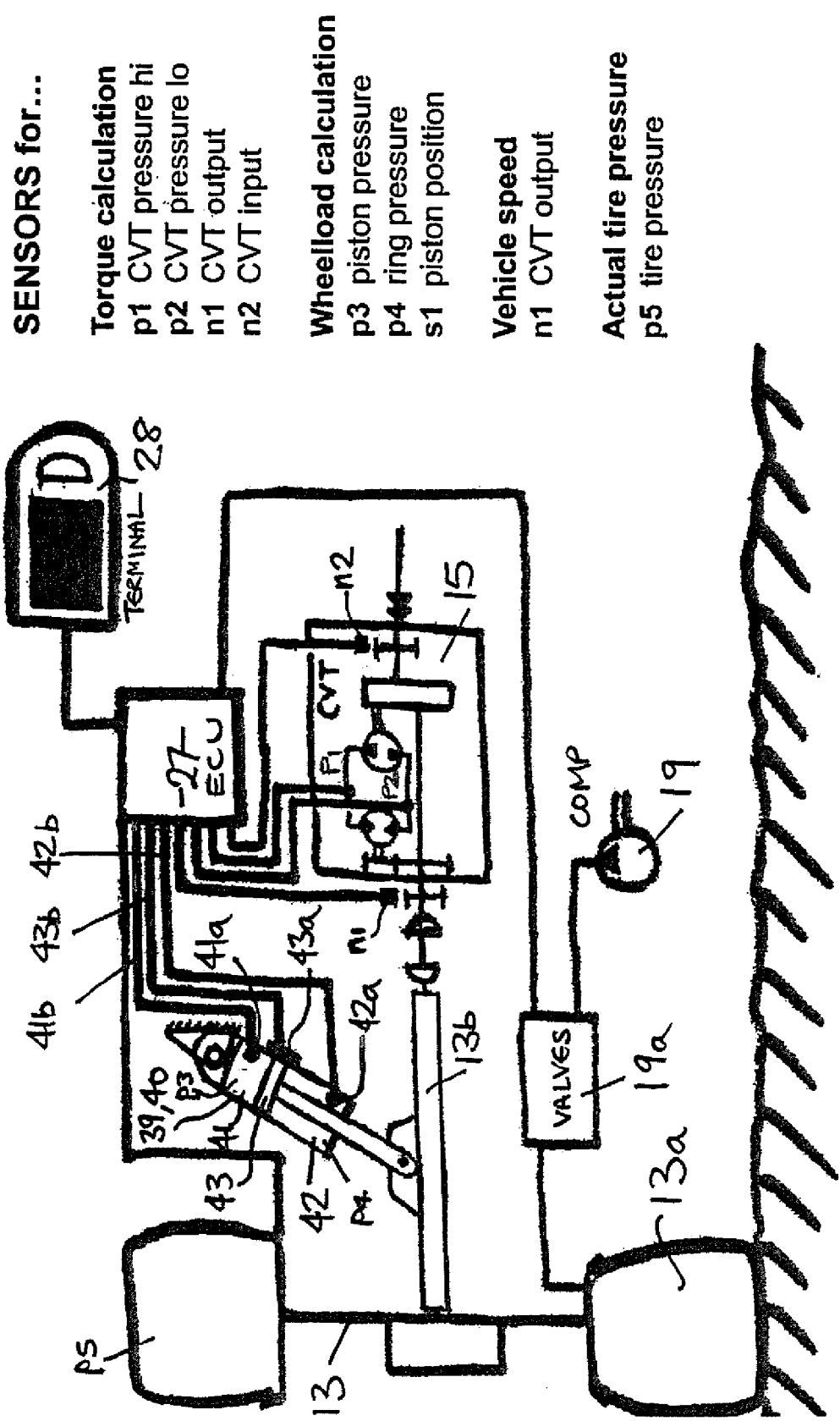
FIG. 2 show diagrammatically details of a suspended axle and CVT transmission and the associated sensors for the determination of wheel load and applied torque.

Front axle 21 includes fluid pressure controlled suspension units 39 and 40 provided one on each side of the tractor and diagrammatically shown in FIG. 2. Each front wheel 13 has vertically movable drive shaft 13b which is connected with transmission 15. This drive shaft 13b is supported by the associated suspension unit 39, 40 which is of the double acting type with chambers 41 and 42 provided on opposite sides of a movable piston 43. By controlling the pressure levels in chamber 41 and 42 and the position of piston 43 the level of damping and ride height of the front wheels is determined. When the tractor has a suspended front axle 21, as shown in FIG. 2, the pressure in chambers 41 and 42 is sensed by pressure sensors 41a and 42a and the position of piston 43 is sensed by position sensor 43a. These sensors communicate their outputs to control unit 27 via lines 41b, 42b and 43b respectively.

The wheel loads determined from sensors 37, 41a, 42a, and 43a may be verified by measuring the load applied on rear implement attachment lower links 23.

The vertical implement load may be measured using the pressure in hydraulic hitch cylinders (not shown in FIG. 1) which raise the draft links 23. For a tractor fitted with a three point coupling, the force applied to the tractor via the top link (also not shown in FIG. 1) may be measured (either with another load pin or with pressure and angle sensors).

Since the wheel load of a tractor results from:

Empty load of the tractor + Addditional ballast weight + vertical load of the implement = Overall wheel load.

So the system may check, based on known values for the empty load of the tractor and the measured value for vertical load of the implement and wheel load whether a ballast weight is attached and the value of any added weight.

Front wheels 13 are provided with a system for adjusting the pressure within front tyres 13a using compressor 19 and control valves 19a. A similar arrangement is provided for varying the pressure of the tyres 14a of the rear wheels 14. Examples of suitable forms of tyre pressure control system are shown in the Applicant's co-pending UK patent applications numbers 0911309.3, 0922016.1, 1016662.7, 1016661.9, 1021928.5, 1021929.3, 1021931.9.

In accordance with the present invention, the tractor control system will advise the tractor operator as to the optimum weight of the tractor for the pull force being applied to the implement or trailer which the tractor is currently pulling and will also advise the operator as to the appropriate tyre pressure for the current wheel load and ground speed. If the tractor is fitted with a tyre pressure monitoring and inflation/deflation system then the control system can be arranged to automatically adjust the tyre pressure to the appropriate level.

For lowest overall sinking of the tyres into the soil and for minimum compaction the same tyre pressure according appropriate wheel load distribution should be used in all tyres. Also for off road applications the lowest tyre pressure should be used which does not damage the tyres as this minimises rolling resistance and lowers contact pressure and increases pulling force due to the larger contact area with the ground.

As described above, the tractor has pressure sensors 41a, 42a and position sensor 43a which enable the load supported by the wheels of the front axle 21 to be determined by the control unit and strain gauge sensors 37 associated with each side of the back axle housing 24 which enable the control unit to determine the load carried by the wheels of the rear axle 22. Thus the total weight of the tractor can be determined during operation. If, for example, the load supported by the front wheels is 20 kN (2 tons) and the load supported by the rear wheels is 60 KN (6 tons), the overall weight of the tractor is 80 kN (8 tons).

Pull force F being currently applied to the implement or trailer can be determined using the sensing pins 25 which connect the lower links 23 to the tractor chassis. Alternatively, if a CVT transmission is used with a hydraulic pump and motor circuit, the wheel or axle torque can be determined from the pressure in this hydraulic circuit and other parameters (e.g. intake volume of the hydraulic motor, ratio setpoint, pivot angle of the axial piston type hydraulic motor). The wheel or axle torque, divided by the dynamic wheel radius is a measure for the wheel circumference force, consisting of rolling resistance force and pull thus giving a rough estimation of pull. (although problems can arise using this method of pull force determination as roll resistance must be considered).

If the current pull force F is say 40 kN (4 tons), then, using the generally accepted relationship of Pull Force/Tractor weight, which is also known as driving force coefficient or net traction ratio KAPPA, of 0.4 this gives an optimum tractor weight of 100 kN (10 tons). This relation of 0.4 is chosen based the characteristic maps empirically determined by Zoz, Brixius and others shown in FIG. 9. The characteristic map shows the relationship between the Tractive Efficiency ETA and the driving force coefficient KAPPA related to different soil conditions shown in lines BN10, BN15 etc. BN thereby represents the mobility index which is empirically determined for different soil conditions and tyre sizes. The TractiveEfficiency ETA is determined by the equation:

$$ETA = \frac{\text{Pull Force Performance}}{\text{Overall Wheel Hub Performance}}$$

As clearly seen form the above shown equation, the main target is to reach a maximum for ETA so that the performance supplied by the wheels result in a maximum pull performance.

Figure 9:
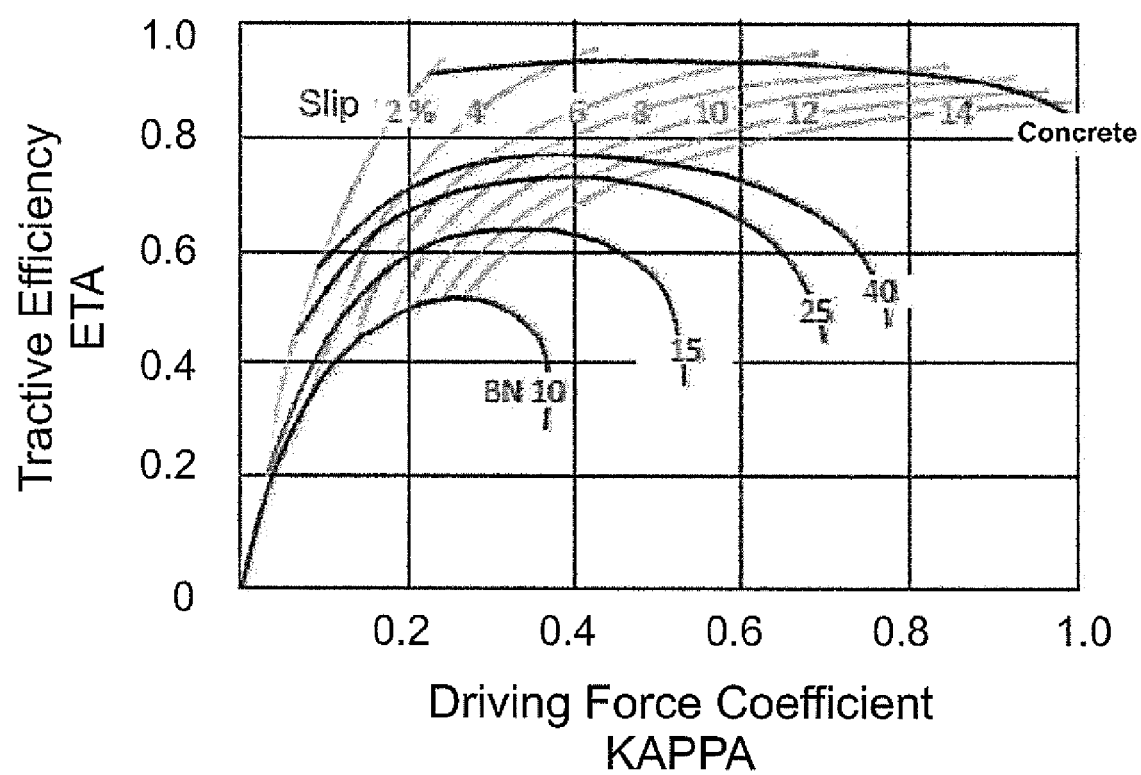
FIG. 9 shows a characteristic map of the relationship between the Tractive Efficiency (ETA) and the driving force coefficient (KAPPA) related to different soil conditions represented the mobility index (BN)

As shown in FIG. 9 different soil conditions are represented by different mobility indexes BN. It will be noted that for mobility indexes BN 15, BN 25, BN 40 and Concrete the maximum value of ETA is achieved at a value of KAPPA around 0.4. Mobility index BN10, which does follow this assumption, must be seen as a soil condition which is not suitable for high pull performance operation, e.g. very wet, muddy ground.

The above method of deriving KAPPA gives a sufficiently accurate value of KAPPA for most tractor applications. Other characteristic maps (e.g. for further regions and soil conditions), may result in other values for KAPPA.

Thus in the example quoted the operator needs to add 20 kN (2 tons) ballast weight to reach the optimum tractor weight. The question is now where should this weight be added to achieve the optimum axle load ratio and what is the optimum axle load ratio.

Each tractor has an initial weight distribution which is defined by the design of the tractor and the relative weight and position of the tractor components. A standard tractor may have say a 35% of its weight on the front axle and 65% of its weight on the rear axle when no ballast weights or implement is attached.

Tractor tyre manufacturers publish tables of the optimum tyre pressure to be used based on the ground speed of the tractor and the wheel load. FIG. 5 shows tables for the front and rear tyres of a particular make of tyre of a particular size which are typical of the tyres fitted to many tractors. The processing unit 27 has the appropriate tyre pressure tables loaded for the tyres fitted to the tractor.

If the tractor is currently operating at a ground speed of say 10 km/h in a low torque (LT) operation, then looking along the last but one line of the tables of FIG. 5 it can be seen that if a tyre pressure of 1.0 bar is selected this would give a total load capacity of 3645 for the front axle and 5590 for the rear axle. This gives a total load capacity of approximately 10 kN which is the optimum lad capacity required for the current task.

This gives a front axle load percentage of 3645/9235 or 39.5% and a rear axle load percentage of 5590/9235 or 60.5% which rounded up is an axle load ratio front/rear of 40/60.

If one calculates the axle load ratio at 50 km/h using the table in FIG. 5 this gives a front axle load of 3685 and a rear load of 5650 at a common pressure of 1.4 bar. This again gives a ratio of 39.5/60.5, rounded up to 40/60.

So, this specified axle load ratio of 40/60 remains constant for a given tyre size and design for every speed and tyre pressure if a common pressure is used in all tyres as indicated above. So the additional weight to raise the overall weight of the tractor to 100 kN must be added in a manner which achieves this 40/60 weight distribution.

To reach this optimum weight distribution we have a number of possibilities:
   adding (or removing) ballast at one specific position;
   adding and/or removing ballast at more then one position (i.e. rear and front);
   moving the point at which the implement or trailer is coupled to the tractor in a fore and aft and/or upwards and downwards sense (particularly when the implement is coupled to the tractor in front of the rear axle and applies additional downward forces to the tractor|);
   combinations of the above possibilities;
   moving weight on the tractor in a fore and aft sense as mentioned in the Applicant's co-pending application No. 1017368.0, and
   providing a weight transfer system such as a hydraulic cylinder acting between the tractor and implement which can press down on the implement to reduce the weight carried by the rear axle or can pull up on the implement or transfer more of the implement weight onto the rear axle.

The system can calculate all the different options and displays alternatives to the operator depending on the features fitted to the tractor and the available weight options.

For example, assuming that the operator has the ability to add front ballast on top of the front axle and remembering that the tractor currently has a 20 kN loading on the front axle and a 60 kN load on the back axle, the operator can add 20 kN exactly on the front axle and this will give a loading of 40 kN on the front axle and 60 kN on the back axle giving a total load equal to the optimum load of 100 kN.

Alternatively, if, for example, the vehicle manufacturer offers a front ballast weight system with a total weight of say 1800 kg, separated in nine detachable ballast parts of 200 kg., the system may recognize and suggest the appropriate number of 200 kg weights to be used. So instead of suggesting 1190 kg, which is technically not available, the system may then suggest 1200 kg as being the closest weight which the ballast weight system can achieve.

As will be appreciated, adjusting the weight distribution between the axles may not be easy to achieve. If the tractor is provided with a weight 45 at least part of which 45a can be moved in a fore and aft sense (see arrow S in FIG. 4) relative to the tractor chassis, as described in the previously referred to patent application No. 1017368.0, then the weight distribution between the axles can be adjusted in the field either manually by the operator or automatically under the control of the tractor control system by operation of a hydraulic cylinder (not shown) or an electric motor (also not shown) which moves the weight 45a on guide rails 46.

Figure 3:
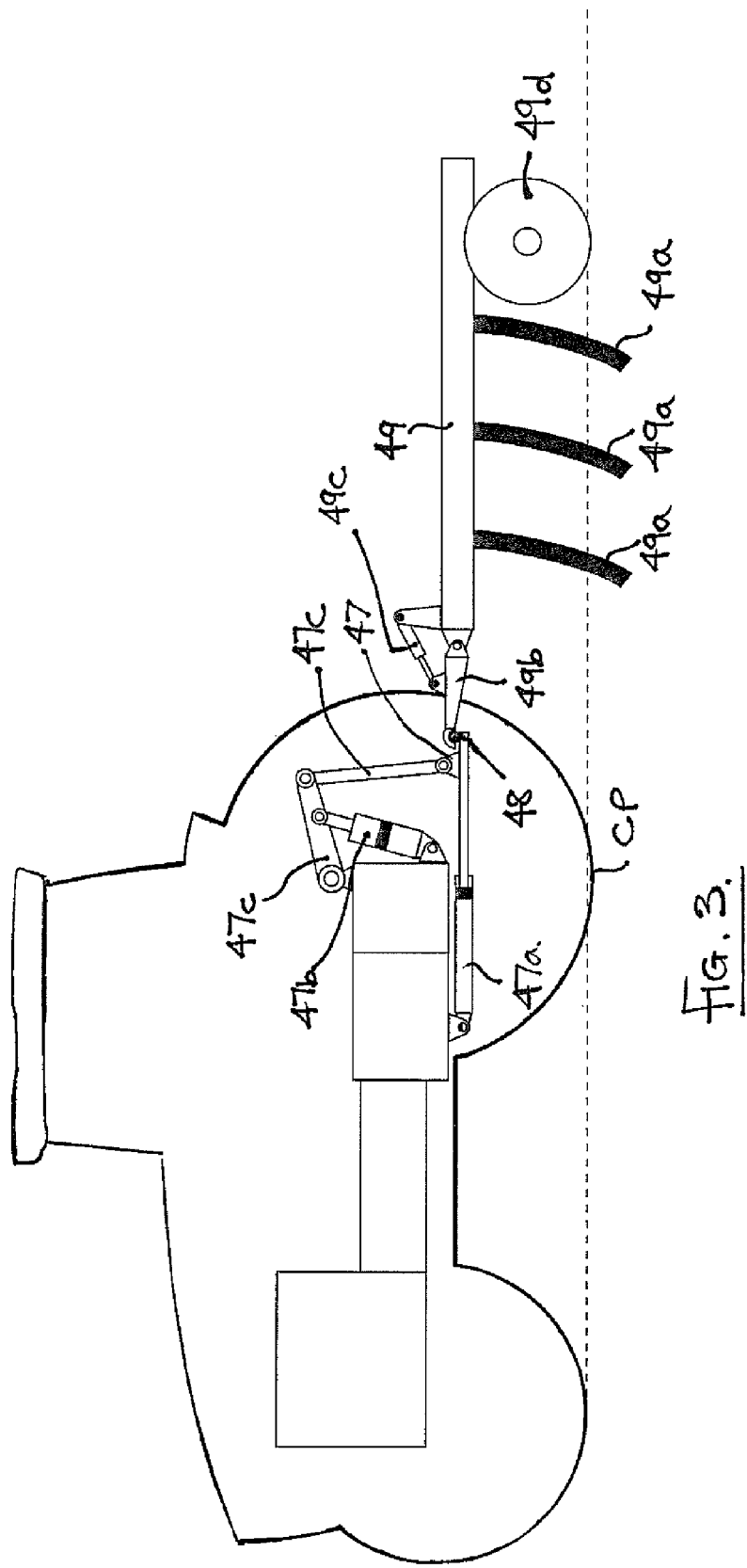
FIG. 3 shows diagrammatically how the point of attachment of an implement may be moved in the fore and aft and/or upwards and downwards direction relative to a tractor.

If the tractor is fitted with a rear hitch 47, as shown in FIG. 3, in which the point 48 at which the implement or trailer 49 is coupled to the tractor 10 can be moved in a fore and aft and/or upwards and downwards sense. A first hydraulic cylinder 47a is provided to move point 48 in a fore and aft sense. A second hydraulic cylinder 47b is provided to adjust heights level of point 48 (via rocker arm 47c and lift rod 47d). As a consequence changing the height of point 48 would result in an unmeant adjustment of the working dept of the ground engaging means 49a of the implement. The implement may therefore be provided with a pivotable towing bar 49b driven by a hydraulic cylinder 49c. Alternatively, a lifting means may be assigned to the ground contact wheels 49d to adjust distance to ground. In the shown embodiment, the hitch 47 is of a ball-type hitch. It is envisaged that other forms of hitch system, e.g. using rear implement attachment lower links 23 shown in FIG. 1, may be adapted to provide adjustability on one or both directions. Thereby, it is again possible to adjust the weight distribution either manually or automatically in the field.

Figure 6:
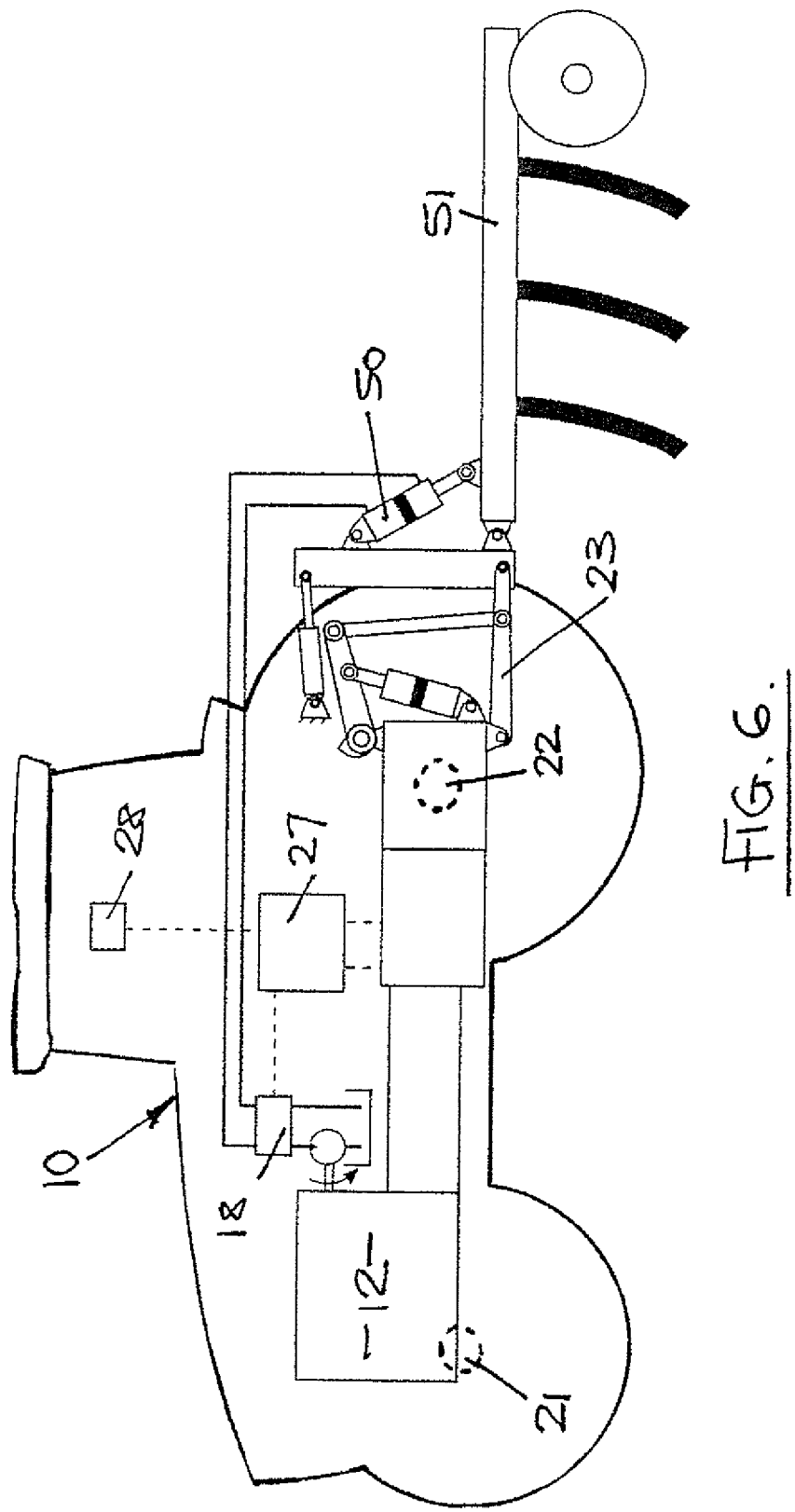
FIG. 6 shows diagrammatically how the weight of a coupled implement may be transferred to or from the associated tractor to adjust axle loading.

FIG. 6 shows a tractor and implement combination provided with a implement weight transfer system in which a cylinder 50 acts between the tractor and implement 51 which can press down on the implement to reduce the weight carried by the rear axle or can pull up on the implement or transfer more of the implement weight onto the rear axle. Again with such an arrangement it is possible to adjust the weight distribution either manually or automatically in the field.

If the tractor is not provided with the above arrangements then the operator may attach more weight than will ultimately be needed before going to field. Once in the field the operator can then remove some of this weight in order to achieve the optimum overall weight and adjust the position of the weight to achieve the optimum weight distribution. Many tractors are fitted with special front weight arrangements which allow this weight to be added or remove using a front weight lifting unit.

Also, the driver can save the weight recommendations from the control system and add weight when returning to the farm (for taking fuel) or reloading or for use next year if he is going on the same field with the same implement.

If the tractor has a drive transmission which can vary the proportion of engine output torque which is directed to each axle, the torque is preferably proportioned so that each wheel operates at substantially the same level of slip relative to the contacting ground.

In addition, the system measures torque at the wheel hub so the decision whether the tractor is driving 10 km/h (with high or low torque on the wheel hub) needed for the tyre table is taken by the system and not by the driver who can only guess about torque based on experience.

The display terminal 18 of the system displays various operating parameters of the tractor such as tractor ground speed, fuel consumption, tractor position, current front and rear tyre pressures, wheel load and pull force.

Additionally, as discussed above, the terminal displays recommendations to the operator regarding tractor weight and tyre pressure. The system also warns the driver if for example the wheel loading is too high for the current tyre pressure (if not automatically adjusting it). Or it may warn when tractor is overloaded or may tend to overturn due to an imbalance in the transverse or longitudinal wheel load distribution.

In addition, the terminal display also shows Efficiency parameters such as:

$$\text{Engine (Efficiency)} = \frac{\text{Performance output of the crank shaft}}{\text{Performance input provided by Fuel}}$$

$$\text{Driveline (Efficiency)} = \frac{\text{Performance output of the wheel hub}}{\text{Performance output of the crank shaft}}$$

$$\text{Traction/Tractive (Efficiency)} = \frac{\text{Pull performance}}{\text{Performance output of the wheel hub}}$$

$$\text{Crank to Hitch} = \frac{\text{Pull performance}}{\text{Performance output of the crank shaft}}$$

$$\text{Tank to Hitch} = \frac{\text{Pull performance}}{\text{Performance input provided by Fuel}}$$

The various values required to determine the above efficiency parameters are determined as follows:

Performance Output of the Crankshaft is determined from the characteristic map of engine power output plotted against engine speed which are provided by the engine manufacturer with assumptions made as to power which should be subtracted which is supplied to secondary drives like cooling fan or pumps for oil and water.

Performance Input Provided by Fuel is determined by multiplying the fuel consumed with the chemical energy content of the fuel. Diesel has a specific energy content of about 35.6 MJ/1~10 kWh/l. So multiplying with the consumption per time delivers performance in kW. Alternatively the map of fuel consumption against engine speed supplied by engine manufacturer can be used.

Performance Output of the Wheel Hub is calculated by:

$$P = \frac{MT * nT}{9550}$$

Whereby the performance P on the wheel hub is depending on the output torque of the transmission MT (determined as described above depending on CVT parameters) and the wheel speed nT which can be sensed by having speed sensor in the respective wheels or by measuring the output speed of the transmission which is then transferred to wheel speed by including final drive ratios and efficiencies (if appropriate). In case of a vehicle equipped with fixed torque distribution to each axle, like in current standard tractors, the overall torque is distributed according ratios between the front and rear axle. Alternatively, if the torque can be distributed independently, each axle or wheel can be considered resulting in an overall sum.

Pull Performance

Pull force F being currently applied to the implement or trailer can be determined using the sensing pins 25 which connect the lower links 23 to the tractor chassis.

Alternatively, if a CVT transmission is used with a hydraulic pump and motor circuit, the pull force can be determined from the pressure in this hydraulic circuit via transmission output torque.

Pull force multiplied with current vehicle speed provides pull performance. The current vehicle speed is thereby measured by a Radar sensor or by using GPS data.

These efficiency values may be displayed as absolute values. However, since typically 81% of the input provided by fuel is lost on its way through the tractor it may be preferable to give each parameter a maximum efficiency value and then display the parameter using a scale ending up with 100%.

Figure 7:
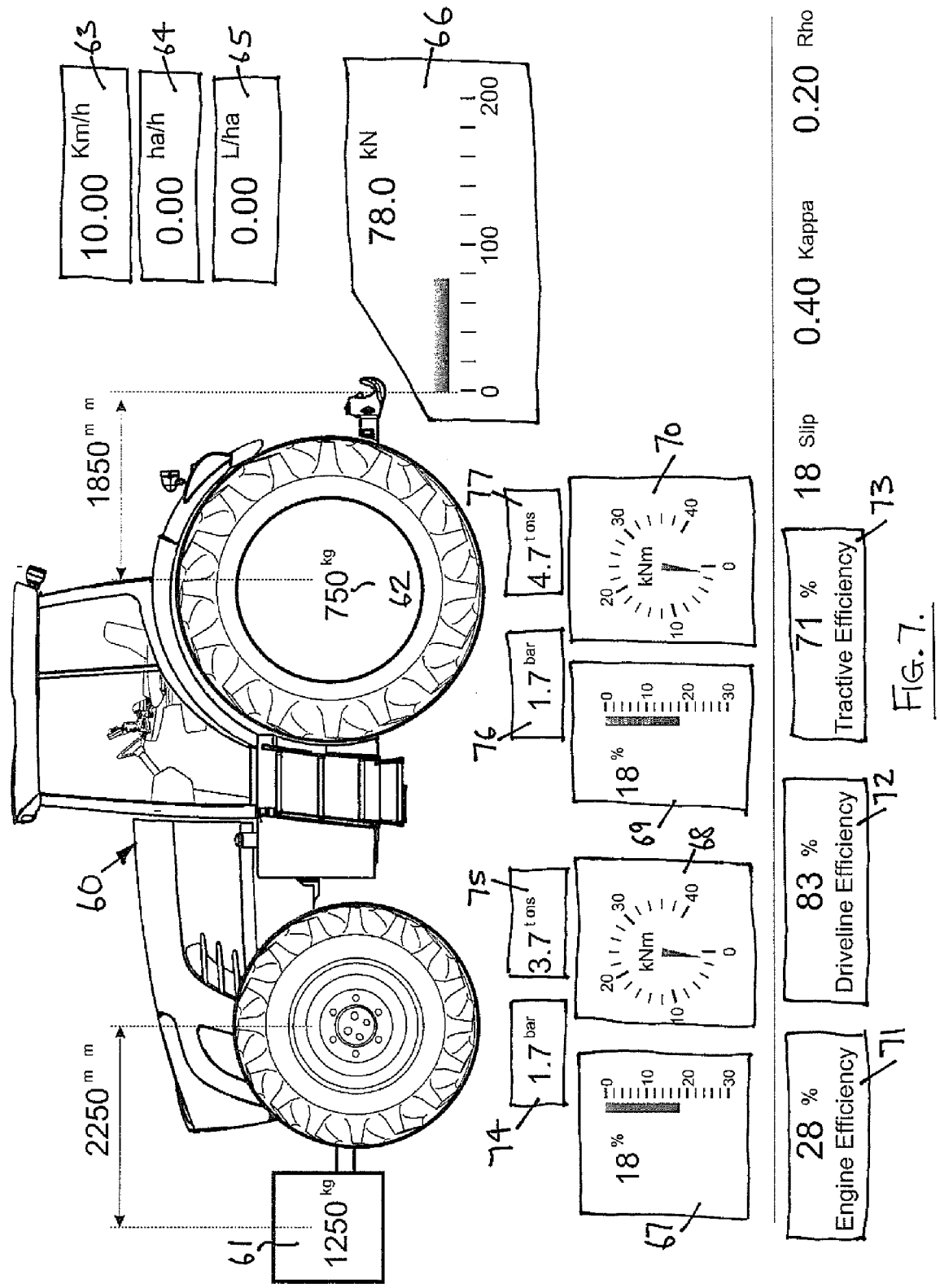
FIGS. 7 and 8 show diagrammatically alternative forms of display layout which can be used in a control system in accordance with the present invention.
Figure 8:
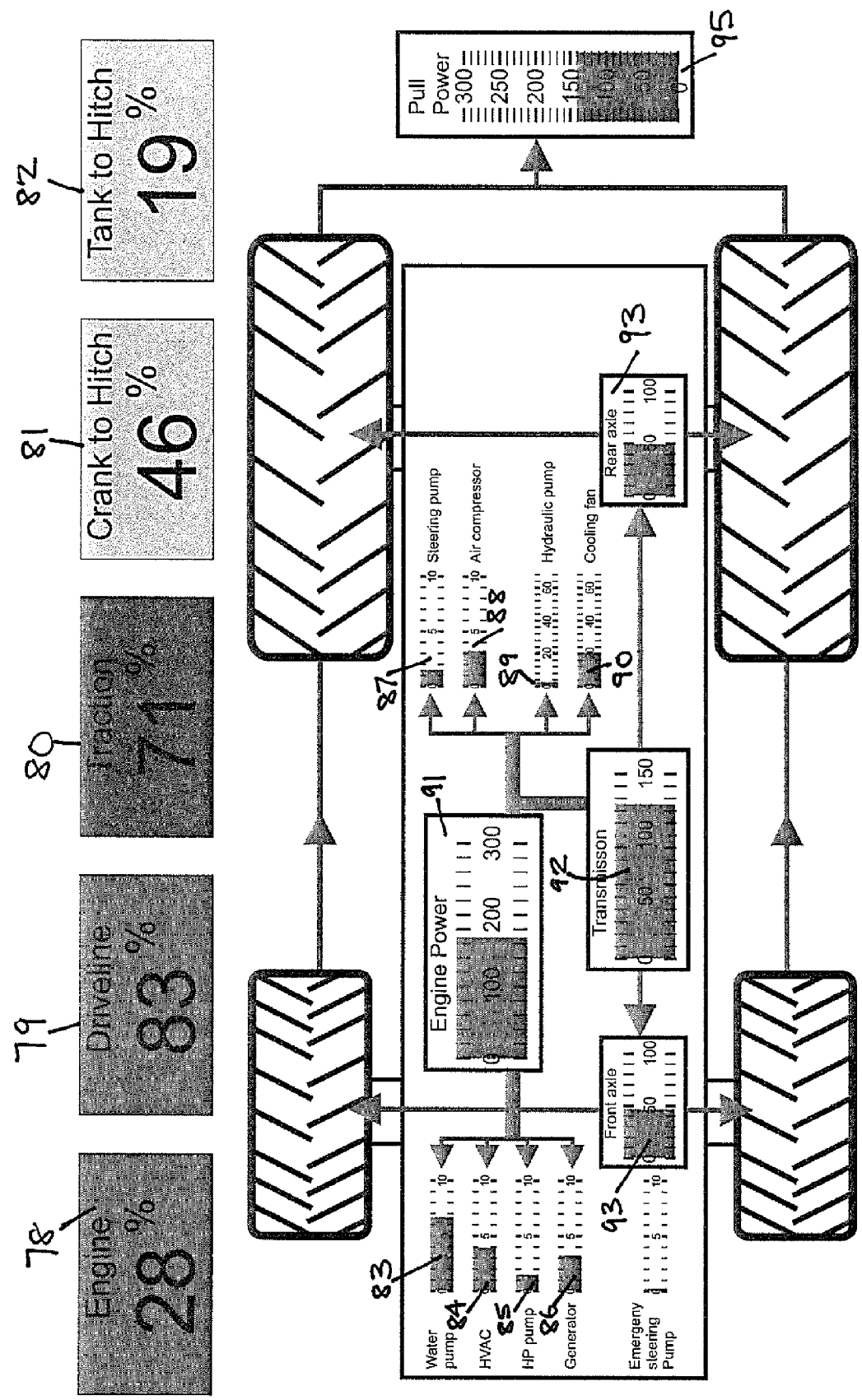

FIGS. 7 and 8 show different layouts for the display of information to the tractor operator.

In FIG. 7 a depiction of the tractor is shown at 60 on which is displayed at 61 the front weight attached and at 62 the wheel weight attached. Display areas 63, 64 and 65 display the vehicle speed, acreage performance in hectares/hour and acreage fuel consumption in liters/hectare. Display areas 66, 67, 68, 69 and 70 display the current pull force applied to the implement, front axle slip, front axle torque, rear axle slip and rear axle torque respectively. Display areas 71, 72 and 73 display engine efficiency, drive line efficiency and tractive efficiency. Display areas 74, 75, 76 and 77 display front tyre pressure, front wheel load, rear tyre pressure and rear wheel load respectively.

If an implement weight transfer system as described in FIG. 6 is provided on the tractor, part of the weight of a coupled implement may be transferred to or from the associated tractor to adjust axle loading. Therefore, it may be advantageous to display the ratio of wheel load transferred by the implement. E.g. the display areas 75 or 77 showing front and rear wheel load may be split up in three values if the implement weight transfer system is activated representing:

1) the wheel load portion received resulting from the weight of the tractor and any ballast weight added but excluding any implement weight transfer;

2) the wheel load portion resulting from the transfer of part of the weight of the implement on to the tractor, and 3) The overall sum of 1) and 2)

With such a three part display the operator can see the different influencing parameters in detail.

The display layout may change between different modes:

A) A first information mode which only shows the information about the parameters. This mode may include warning e.g. if the acceptable wheel load is exceeded or the set point of the tyre pressure adjusted by the driver (if not automatically) does not meet the requirements according size and wheel load defined by look-up tables as described in FIG. 5.

B) A second mode may give the operator the possibility to change settings manually, e.g to enter ballast weight added.

C) A third mode, which may be included in the second mode, which may give advice to the operator which values must be changed (e.g. ballast weight) to improve efficiency.

D) A fourth mode in accordance with the present invention in which the driver's input is processed and the results of the real-time simulation are shown. In this simulation mode the operator can input proposed changes and use the simulation facility to check the effect of the planned changes before physically trying them on the tractor. This is an important step forward in the art which greatly improves the usefulness of the display/control system.

These modes may be provided by pop-up menus, extra pages or by using different colours for measured values, advised values, values changed by operator and simulation results.

In addition, the appearance of the display layout may be flexible. If the control system recognizes that an option shown in the maximum setting of the display is not available, e.g. the system to move the hitch point as described in FIG. 3 is not being used, the display may blank or grey the respective area, so that the driver is not misguided.

In the alternative display arrangement of FIG. 8, areas 78, 79, 80, 81 and 82 display the engine, driveline, traction, crank to hitch and tank to hitch efficiencies. Displays 83, 84, 85, 86 indicate the current power consumption in kW of the water pump, HVAC system, High Pressure pump and generator.

Similarly displays 87, 88, 89 and 90 indicate the current power consumption in kW of the steering pump, air compressor, hydraulic pump and cooling fan. Display 91 shows the current power output of the engine in kW and displays 92 shows the proportion of the current engine output going to the transmission. Displays 93 and 94 show the power going to the rear and front wheels respectively whilst display 95 shows the current pulling power being applied to the implement or trailer.

In the embodiment described above, a constant value of 0.4 for the quotient of Pull Force and Tractor Weight, which is known as the driving force coefficient KAPPA, is used. However a more accurate control can be obtained if the actual real time value of KAPPA is used. A method of determine the real time value of KAPPA in dependency of/in relation to the TractiveEfficiency ETA is described below with reference to with FIGS. 10*a* to 10*g*.

In general, the parameters which need to be measured in real time to determine ETA and KAPPA are:

$$ETA = \frac{\text{Pull Force Performance}}{\text{Overall Wheel Hub Performance}}$$

$$KAPPA = \frac{\text{Pull Force}}{\text{Tractor weight}}$$

The method includes the steps of

Figure 10A:
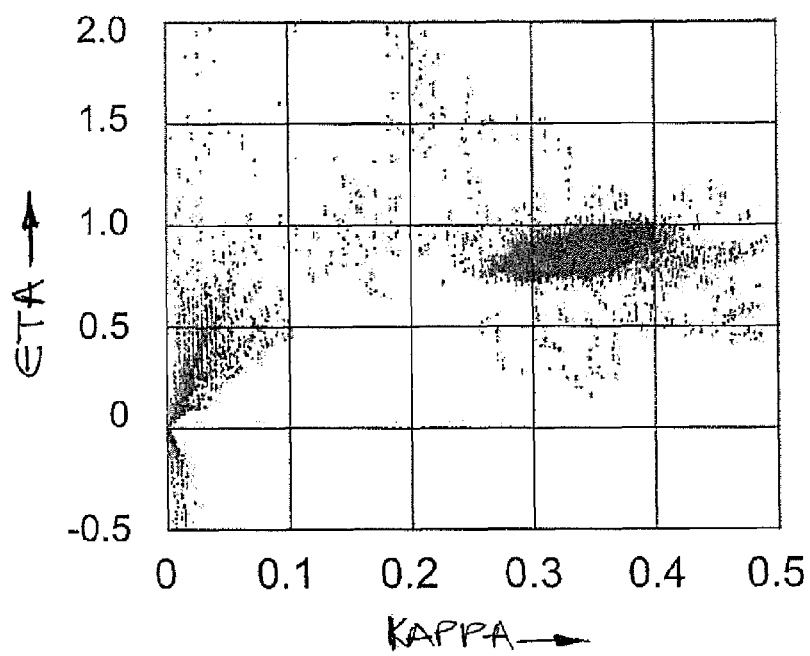
FIGS. 10a to 10g show the measurement and analysis of the driving force coefficient (KAPPA) in real time.
Figure 10B:
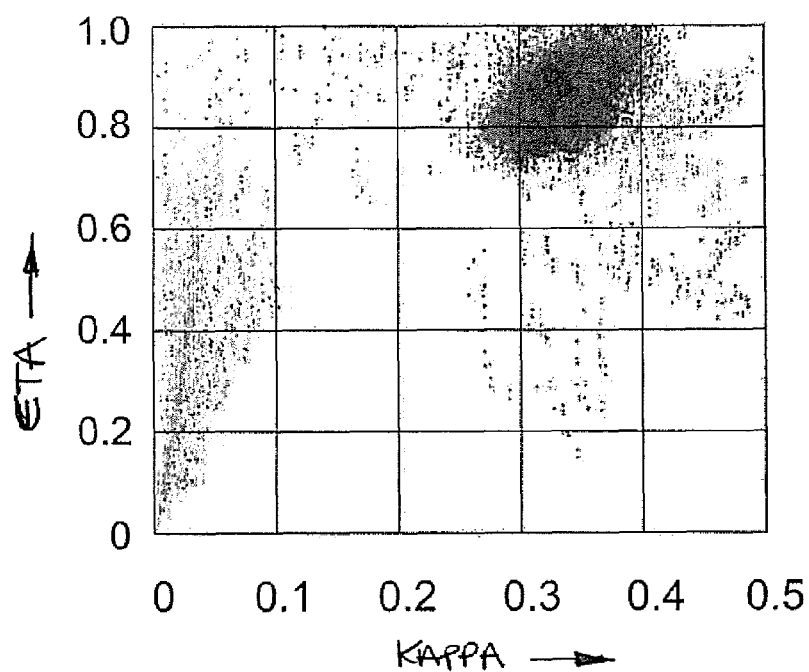

A) Driving the tractor over the ground and measuring the parameter values to determine ETA and KAPPA. These values are plotted on a scatter-plot representing ETA in dependency of KAPPA. The scatter-plot is a consequence of dynamic oscillations, e.g. caused by non homogeneous soil or uphill or downhill driving. In FIG. 10*a* the graph is limited to a maximum value of KAPPA=0.5 which is result of the soil condition during the particular measurement sequence. For other soil conditions, the range of KAPPA may be different.

Tests in the field have shown that a measurement run of about 1 minute may be sufficient.

As best seen in FIG. 10*a*, the tractive efficiency varies in between −0.5 (−50%) and 2.0 (200%) which is not possible in a physical sense.

B) Therefore, the next step is to purge the scatter-plot which is cleaned up by removing values outside the range ETA=0 to 1.0. This results in the graph shown in FIG. 10*b*.

Figure 10C:
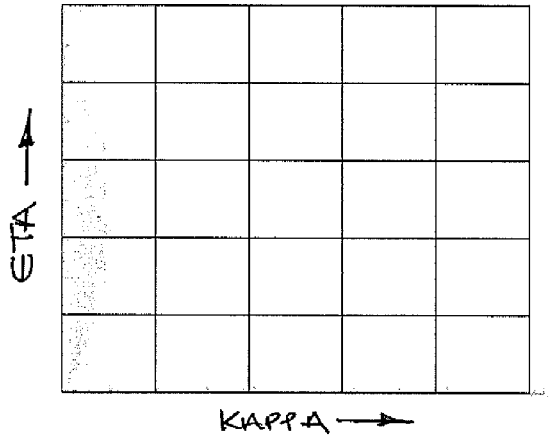
Figure 10D:
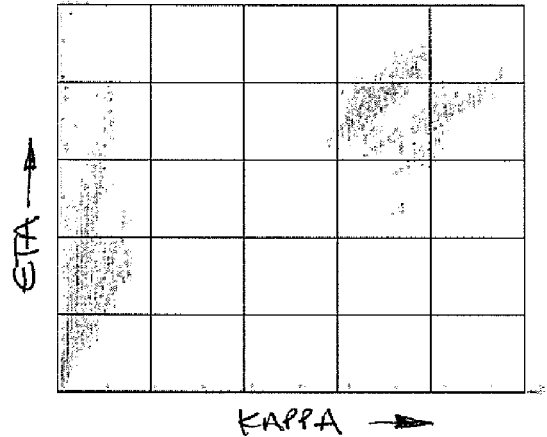
Figure 10E:
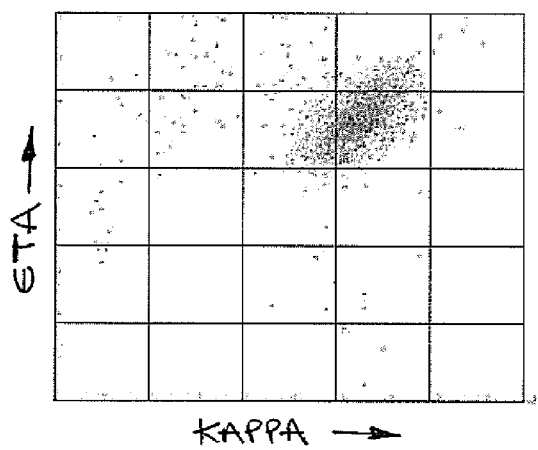

C) A Further step provides a second level of purging the graph. FIGS. 10*c* to 10*e* shows different sets of values extracted from FIG. 10*b* which are eliminated thus:

FIG. 10*c* shows those values where the pull force was very minor. For example, values received when the implement was lifted (e.g. during headland travel) are eliminated.

FIG. 10*d* shows values which are eliminated due to the fact that these values were received during high acceleration (both, negative and positive). We only want to use KAPPA values which represent the pull force used when moving at a substantially constant speed hence the values high acceleration values of FIG. 10*d* are eliminated.

FIG. 10*e* show further values to be eliminated. If the value for the tractive efficiency varies very much within a short period of time, this indicates failures during measurement and can be determined by the derivation of ETA. Those related values are also deleted.

Figure 10F:
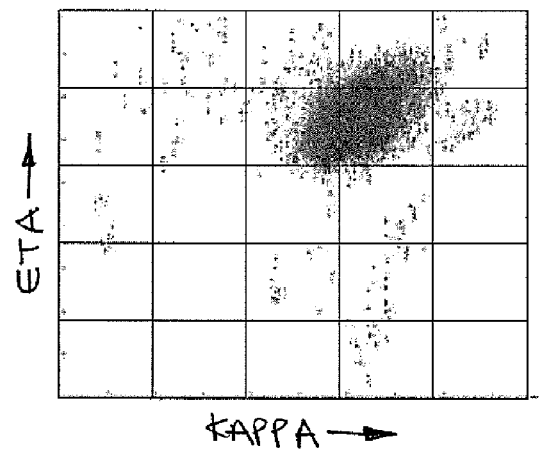

As shown in FIG. 10*f*, a scatter-plot remains which is purged with regard to extreme variations.

D) In the next step, the scale for KAPPA is split up into small intervals of say 0.01257. All the measured values for ETA in a particular interval are then averaged and the average value for each time interval is plotted resulting in the line graph G shown in FIG. 10*g*. This graph G represents a smoothing function achieved by the above averaging technique (in this case determined by adding a fourth degree polynomial based on the method of the minimum error square). Furthermore, the main working point WP is identified by determining the interval of KAPPA in which the tractor operates for the longest time.

Figure 10G:
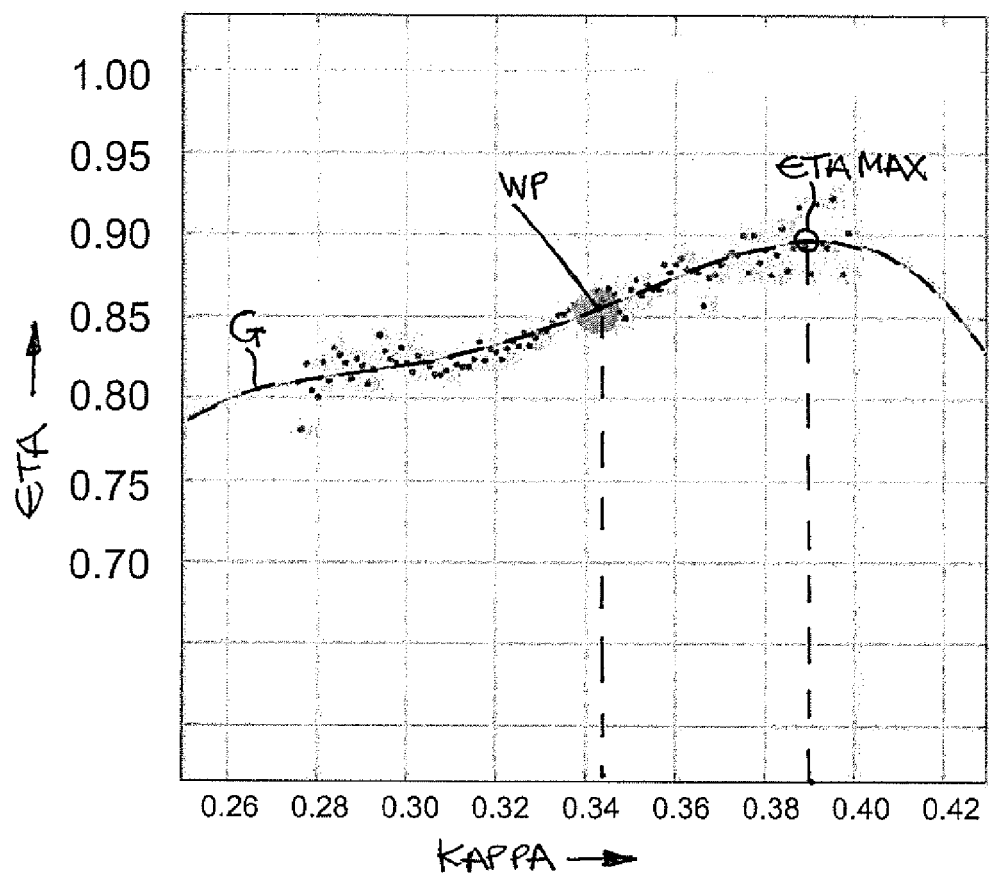

As seen in FIG. 10*g* the current working point WP (ETA=0.85; KAPPA=0.34) is below the maximum ETA value (ETA approx. 0.90 and KAPPA=0.39).

There are two alternative methods to define the target for KAPPA:

Based on a Smoothing Function:

The working point is moved on the determined graph G to the point of maximum ETAMAX. This, for example in the results shown in FIG. 10*g*, corresponds to KAPPA value of 0.39 may result in failure caused by the smoothing function. But as e.g. ballast weight may only be available in fixed steps, this will be sufficient in practice.

Based on Characteristic Maps for BN:

The control system contains various characteristic maps similar to the one shown in FIG. 9 which may represent different soil conditions. These characteristic maps may be taken from literature or specific measurements on the respective field area. With the help of main working point WP the most suitable curve representing the mobility index BN can be identified. Similar to the method mentioned above, the working point is then moved towards maximum ETA and delivers the value for KAPPA. As described in Step A, uphill and downhill driving may result in rogue values for KAPPA/ETA determination. An additional sensor, e.g. an inclination sensor (which may be part of an Anti-Skid system) may provide respective information referring to uphill/downhill driving to eliminate these values. The system may contain other sensors to determine conditions where measured values represent rogue conditions not suitable for KAPPA determination. The respective values may then be sorted out according sensor information.

The described determination of ETA and KAPPA during operation offers a real-time capable procedure to adapt parameters of the vehicle according soil condition. In the shown embodiment the focus was on weight optimization. It is envisaged that the methods offers additional possibilities:

The soil conditions determined with the procedure may be used to generate soil condition maps which are later on used for precision farming On the tractor, information about soil conditions may be used to adjust soil work, e.g. to adjust the working depth of a plough according current soil condition.

Additionally, knowing soil moisture may be used to optimise irrigation.

As discussed above, to reduce soil compaction and improve tractive efficiency, the lowest possible tyre pressure should be chosen. Look-up tables provided by tyre manufactures are based on a usage on hard ground like concrete or asphalt. The values given ensure that, on hard ground, the tyre deformation is limited to a level which avoids damage. The tyre pressure values may be much lower on soft ground as part of the tyre deformation is transferred into soil deformation. The system described above may be used to determine softer soil condition and thereby define lower tyre pressures than given in current look-up tables. The set-up for soft ground may be defined in cooperation with a tyre manufacturer and enable a even more reduced tyre pressure without damaging the tyre.

The present invention is defined by the following claims but it is understood that the Applicant reserves the right to claim any novel feature described above or shown in the accompanying drawings.

The invention claimed is:

1. A control system for a tractor fitted with two or more axles which carry wheels having pneumatic tires and which is set up to pull an implement or trailer,
the system having a display terminal for displaying to a tractor operator tractor performance parameters and having sensors to determine the current pull force applied to the implement or trailer, the current wheel load and the current tractor ground speed,
the system also having a processing unit which determines and advises the tractor operator via the display terminal as to the optimum weight of the tractor using a predetermined relationship between pull force and tractor weight and also the required load on each axle to achieve a predetermined optimum axle load ration,
in which the processing unit calculates a real time value for the current ratio of pull force to tractor weight, and
in which the real time value of the current ratio of pull force to tractor weight is calculated by measuring a plurality of individual values of pull force over a sample period and calculating in the processing unit the respective ratios therefrom, eliminating extreme, clearly incorrect and unrepresentative individual ratio values, averaging the ratio values in individual ratio zones and plotting these averaged zonal ratio values recorded in the sample period to generate a best fit curve for these plotted values, then selecting as the current real time value either the average ratio value for the ratio zone in which the tractor is operating for the longest time or the ratio on the curve with the highest value of tractive efficiency defined as pull force applied to the implement or trailer divided by performance output at wheel hub.

2. The system according to claim 1 in which the processing unit also advises the operator via the display terminal as to the appropriate tire pressure for the current wheel load and tractor ground speed using a look-up table.

3. The system according to claim 2 in which the look-up table provides the lowest equal tire pressure appropriate for the current wheel load, ground speed and tire size fitted to the tractor to give minimum ground pressure to carry the load.

4. The system according to claim 1 in which the optimum axle load ratio applied is a 40/60 ratio between the front to rear axle load ratio.

5. The system according to claim 1 in which the predetermined ratio of pull load to tractor weight is 0.4.

6. The system according to claim 1 in which pull load is measured using sensing pins which attach the lower implement attachment links to the tractor.

7. The system according to claim 6 in which the display terminal displays the current pull force applied to the implement or trailer.

8. The system according to claim 1 for a tractor which includes a transmission with a hydraulic circuit in which a hydraulic pump supplies pressure to a hydraulic motor, the pull force being determined by sensing the pressure in the hydraulic circuit, whereby the pressure in the hydraulic circuit is a measure of the wheel or axle torque, the wheel or axle torque divided by the dynamic wheel radius is a measure for the wheel circumference force, consisting of rolling resistance force and pull thus giving a rough estimation of pull force.

9. The system according to claim 1 for a tractor with a rigid unsprung axle in which the wheel load is measured by a strain gauge type sensor which measures the deflection of part of the rigid axle which supports a wheel.

10. The system according to claim 1 for a tractor having an axle suspended by fluid pressure in which the wheel load is determined by measuring the fluid pressure which is suspending the axle and the position of the axle.

11. The system according to claim 1 in which the proportion of the weight of the implement or trailer which is supported by the tractor can be varied, the display terminal indicating the weight of the implement or trailer supported by the tractor to assist the operator in varying the axle load distribution towards the required figure determined by the system.

12. The system according to claim 11 in which a rear hitch which allows the attachment point of the implement or trailer to be moved in fore, aft, downwards and upwards sense relative to the tractor to change the axle load distribution towards the required figure determined by the system.

13. The system according to claim 11 in which the vertical load applied by the implement or trailer to the tractor is measured using pressure sensors in hydraulic cylinders driving lower implement attachment links or top link.

14. The system according to claim 11 for a tractor provided with a weight which is moveable in a fore and aft sense relative to the tractor, the display terminal indicating the change in axle load resulting from the movement of the weight to assist the operator in varying the axle load distribution towards the required figure determined by the system.

15. The system according to claim 1 for a tractor having driven front and rear axles and provided with a drive transmission which can vary the proportion of engine output torque which is directed to each axle, the display terminal displaying the output torque delivered to each axle.

16. The system according to claim 15 in which the processing unit proportions the engine torque between the axles so that each wheel operates at substantially the same level of slip relative to the contacting ground independent of external operating conditions.

17. The system according to claim 16 in which the display unit displays the wheel slip of each axle.

18. The system according to claim 1 in which the processing unit calculates and the display terminal displays engine efficiency which is equal to the engine output performance at the crank shaft divided by output provided by the fuel consumed.

19. The system according to claim 1 in which the processing unit calculates and the display terminal displays driveline efficiency which is equal to performance output at the wheel hub divided by performance output at the crank shaft.

20. The system according to claim 1 in which the processing unit calculates and the display terminal displays tractive efficiency which is equal to the pull force applied to the implement or trailer divided by performance output at the wheel hub.

21. The system according claim 1 in which the processing unit calculates and the display terminal displays crank to hitch efficiency which is equal to the pull force applied to the implement or trailer divided by performance output at the crank shaft.

22. The system according to claim 1 in which the processing unit calculates and the display terminal displays tank to hitch efficiency which is equal to the pull force applied to the implement or trailer divided by output provided by the fuel consumed.

23. The system according to claim 1 in which the processing unit receives signals from sensors which determine various operating conditions of the tractor and operator's inputs and process these signals and inputs to provide selected performance parameters for display on the display means, the processing unit also providing a simulation mode in which the operator can enter proposed changes in operating conditions of the tractor and the processing unit can indicate on the display terminal the effect of these proposed changes on selected tractor performance parameters.

24. The system according to claim 23 in which the display terminal advises the operator on changes which can be made to the operating conditions of the tractor to improve operating efficiency.

25. The system according to claim 24 in which the display terminal differentiates between measured values of displayed parameters, advised values of the displayed parameters, values of the displayed parameters changed by the operator and simulated values of the displayed parameters.

26. The system according to claim 25 in which the system differentiates between the different types of displayed parameters by using at least one of different display pages, separate pop-up menus, and different colors for the different types of displayed values.

27. The system according to claim 23 in which the processing unit can be set up to issue output signals to automatically change certain operating conditions of the tractor to improve operating efficiency.

28. The system according to claim 23 in which the processing unit recognizes when certain facilities or functions are not available on the tractor and advises the operator accordingly via the display terminal.

29. The system according to claim 1 in which the display terminal indicates the current axle or wheel loading of the tractor.

30. The system according to claim 1 in which the real time value of the current ratio of pull force divided by tractor weight is displayed on the display terminal.

31. A control system for a tractor fitted with two or more axles which carry wheels and which is set up to pull an implement or trailer, the system having a display terminal for displaying to a tractor operator tractor performance parameters and a having sensors to determine the current pull force applied to the implement or trailer and the current wheel load, the system also having a processing unit which determines the real time current ratio pull force and tractor weight by measuring a plurality of individual values of pull force over a sample period and calculating in the processing unit the respective ratios therefrom, eliminating extreme, clearly incorrect and unrepresentative individual ratio values, averaging the ratio values in individual ratio zones and plotting these averaged zonal ratio values recorded in the sample period to generate a best fit curve for these plotted values, then selecting as the current real time value either the average ratio value for the ratio zone in which the tractor is operating for the longest time or the ratio on the curve with the highest value of tractive efficiency defined as pull force applied to the implement or trailer divided by performance output at wheel hub.

* * * * *